(12) United States Patent
Hermann

(10) Patent No.: US 9,492,767 B2
(45) Date of Patent: Nov. 15, 2016

(54) FILTER PLATE FOR A FILTER PRESS

(75) Inventor: Manfred P. Hermann, Nürnberg (DE)

(73) Assignee: JVK Filtration Systems GmbH, Georgensgmund (DE)

( * ) Notice: Subject to any disclaimer, the term of this patent is extended or adjusted under 35 U.S.C. 154(b) by 333 days.

(21) Appl. No.: 14/240,517

(22) PCT Filed: Aug. 23, 2012

(86) PCT No.: PCT/EP2012/066380
§ 371 (c)(1),
(2), (4) Date: Mar. 24, 2014

(87) PCT Pub. No.: WO2013/026893
PCT Pub. Date: Feb. 28, 2013

(65) Prior Publication Data
US 2014/0209524 A1   Jul. 31, 2014

(30) Foreign Application Priority Data
Aug. 25, 2011   (DE) .................... 20 2011 104 970 U

(51) Int. Cl.
*B01D 25/21*   (2006.01)
*B01D 25/28*   (2006.01)

(52) U.S. Cl.
CPC ........... *B01D 25/215* (2013.01); *B01D 25/285* (2013.01)

(58) Field of Classification Search
None
See application file for complete search history.

(56) References Cited

U.S. PATENT DOCUMENTS

| 3,931,014 | A | * | 1/1976 | Heimbach | B01D 25/215 |
| | | | | | 210/231 |
| 4,839,045 | A | | 6/1989 | Wildner | 210/228 |
| 4,897,190 | A | * | 1/1990 | Klinkau | B01D 25/164 |
| | | | | | 210/228 |
| 6,180,002 | B1 | * | 1/2001 | Higgins | B01D 25/215 |
| | | | | | 100/211 |
| 6,365,043 | B1 | | 4/2002 | Häberle | 210/231 |
| 2012/0285871 | A1 | | 11/2012 | Hermann | 210/149 |

FOREIGN PATENT DOCUMENTS

| DE | 37 01 862 | | 1/1987 | ............ B01D 25/12 |
| DE | 199 43 584 | | 9/1999 | ............ B01D 25/15 |
| DE | 202009014692 | * | 3/2011 | |
| DE | 20 2009 014 692 | | 4/2011 | ............ B01D 35/18 |
| DE | 20 2010 006 311 | | 7/2011 | ........... B01D 25/168 |
| WO | WO 03/095063 | | 11/2003 | ............ B01D 25/21 |
| WO | WO 2006/114235 | | 11/2006 | ............ B01D 25/28 |
| WO | WO 2011/138271 | | 11/2011 | ............ B01D 25/12 |

OTHER PUBLICATIONS

International Search Report for International Application No. PCT/EP2012/066380, Nov. 5, 2012.

* cited by examiner

*Primary Examiner* — Benjamin Kurtz
(74) *Attorney, Agent, or Firm* — Kusner & Jaffe

(57) ABSTRACT

A filter plate for a filter press, having a main body and a diaphragm, on the periphery of which there is formed a fastening element, by means of which the diaphragm is fastened non-detachably to the main body, wherein an indentation is formed in the main body, said indentation at least partially accommodating the fastening element of the diaphragm, there being a welded connection between a fastening surface formed by the indentation and a fastening surface formed by the fastening element of the diaphragm.

12 Claims, 4 Drawing Sheets

FILTER PLATE FOR A FILTER PRESS

FIELD OF THE INVENTION

The present invention relates to a filter plate for a filter press, having a main body and a diaphragm, on the periphery of which there is formed a fastening element, by means of which the diaphragm is fastened non-detachably to the main body. The filter plate is thus what is known as a diaphragm filter plate.

BACKGROUND OF THE INVENTION

For a filter press, it is known to form a filter assembly which consists of a plurality of filter plates arranged alongside one another in pairs, Filter chambers are in each case formed between the filter plates. For this purpose, the filter plates have a central filter area and a thicker sealing rim bordering the central filter area. In the filter press, the filter plates can be moved away from and toward one another, as a result of which the filter chambers can be opened and closed.

Each filter chamber usually has at least one inlet and an outlet. The suspension to be filtered, which is usually designated pulp, flows into the filter chamber via the inlet. The suspension is then filtered by means of a filter cloth, with the solids being held back in the filter chamber by the filter cloth, resulting in the production of what is known as a filter cake. The filtrate freed of the solids is passed out of the filter chamber via the outlet.

In order to reduce the residual moisture in the filter cake and to shorten the filtration times, there are known filter presses in which at least one filter chamber of a filter plate has a diaphragm. Such a filter plate is known as a diaphragm filter plate. In a filter press having diaphragm filter plates, the pressure filtration initially carried out is followed by press filtration, in which the elastic diaphragms of the filter chambers are subjected to a pressure medium, as a result of which they constrict the space in which the filter cake is located. In this way, the filter cake is compressed, and as a result the cavities of the filter cake are reduced in size and as a result residual moisture in these cavities is reduced further.

Such a filter press is described for example in WO 03/095063 A1. In the filter press described therein, a plate assembly is formed which alternately has a filter plate and a diaphragm filter plate. The filter plate has a filter cloth on both sides, said filter cloth being fastened in each case in a cutout in the main body of the filter plate. The diaphragm filter plate has a diaphragm on both sides, said diaphragm being fastened detachably to the main body. With the filter press open, the diaphragm can thus be replaced. With the filter press closed, the diaphragm is held only by the press closing force of the opposite filter plate.

A further filter plate having a detachably fastened diaphragm is known from WO 2006/114235 A1. The replaceable diaphragm is in this case fixed to the main body with the aid of a tongue and groove connection.

In the case of filter plates having a replaceable diaphragm, i.e. a diaphragm that is fastened detachably to the main body, the problem arises that at very high filter pressures of for example greater than 30 bar, the connection between the diaphragm and the main body can lose its sealing during operation of the filter press. Furthermore, it is possible for the diaphragm to detach completely from the main body. In addition, the use of filter plates having replaceable diaphragms is disadvantageous in applications in which it is necessary to sterilize the filter plate after use. This is because, in the case of a filter plate having a replaceable diaphragm, regions which are not sterilizable can occur at the cutouts for receiving the diaphragm.

Furthermore, filter plates are known in which the diaphragm is fastened non-detachably to the main body. In this case, the diaphragm is thus not replaceable. Such filter plates are also known as joint-free. They have the advantage that they are particularly easy to clean.

DE 37 01 862 A1 discloses a filter plate having a diaphragm fastened non-detachably to a main body. The filter plate comprises a supporting wall, a plate frame and what is known as a flexible pressing wall. The pressing wall is formed in one piece with the plate frame and adjoins the latter in the peripheral region of the filter chamber or of the pressure chamber. The rigid plate frame consists of a hard plastics material that is able to withstand the closing pressure of the filter press, while the pressing wall consists of an elastic plastics material. The hard and the elastic plastics materials form a copolymeric phase in a transition region between the plate frame and the pressing wall. In order to produce the plate frame with the pressing wall, a pressing method is proposed in which the pre-manufactured plate frame is introduced into the mold and the elastic plastics material for the pressing wall is added to the mold in the form of granules. In the subsequent pressing operation, the granules are then pressed together and to the plate frame under the action of heat.

Finally, DE 199 43 584 C2 discloses a further filter plate having a non-detachably fastened diaphragm. In this filter plate, a rigid supporting wall is formed in one piece with a rigid plate frame. The diaphragm has an edge strip and is welded by way of the latter to the supporting wall.

A disadvantage with known filter plates having a non-detachably fastened diaphragm is that excess welding material can pass into the region between the main body and the diaphragm. This excess emerges in an uncontrolled manner, such that it disrupts the movement of the diaphragm. As a result, a weak point in the connection between the diaphragm and the main body arises. At high pressures, the diaphragm can be damaged at this weak point. Furthermore, in known filter plates having a non-detachably fastened diaphragm, it is possible for the filter cloth applied to the diaphragm to clog an inlet opening of a drainage bore for the filtrate. This risk of clogging is high in particular at very high filtration and squeezing pressures. However, a filter plate having a non-detachably fastened diaphragm is used precisely under such operating conditions.

SUMMARY OF THE INVENTION

The present invention is based on the object of providing a filter plate of the type mentioned at the beginning, in which a non-detachable connection is produced between the diaphragm and the main body, said connection being able to durably withstand high pressures which are applied to the diaphragm.

According to the invention, this object is achieved by a filter plate having the features of the independent claim(s). Advantageous configurations and developments can be gathered from the dependent claims.

The filter plate according to the invention is characterized in that an indentation is formed in the main body, said indentation at least partially accommodating the fastening element of the diaphragm, there being a welded connection between a fastening surface formed by the indentation and a fastening surface formed by the fastening element of the diaphragm.

Within the meaning of the invention, a welded connection is understood to mean that the diaphragm is connected non-detachably to the main body under application of heat and/or pressure. The welded connection can be produced with or without the use of welding fillers. As a result of the welded connection between the diaphragm and the main body, a sealed and durably firm connection between the diaphragm and the main body is produced. As a result of the formation of the indentation in the main body, which receives the fastening element of the diaphragm, it is possible to produce a particularly good form fit between the diaphragm and the main body, thereby avoiding an excess produced during welding passing into the pressure chamber.

Non-detachable fastening of the diaphragm to the main body is understood to mean that the diaphragm cannot be replaced for normal operation of the filter press. Detachment of the diaphragm from the main body results in particular in damage to the filter plate. The diaphragm or another diaphragm can subsequently no longer be readily connected to the filter plate.

According to a development of the filter plate according to the invention, the main body forms a plate frame peripherally and a central body in the center, wherein the main body narrows from the plate frame toward the central body. The indentation is formed in the transition region between the plate frame and the central body of the main body, in particular adjacent to the section which forms the plate frame.

According to a development of the filter plate according to the invention, the thickness of the main body increases outwardly from the central part. The thickness then initially decreases at the indentation and finally increases again up to the thickness at the plate frame, such that a protrusion is formed next to the indentation. This protrusion can come into contact with a section of the diaphragm that is adjacent to the fastening element. Alternatively, the protrusion can form a narrow gap with respect to this section, such that when the diaphragm bends, in particular in the direction of a pressure chamber formed between the central part of the main body and the diaphragm, the section comes into contact with the protrusion and is supported by this protrusion. In this way, it is possible to prevent the diaphragm from being damaged during operation of the filter press in the critical bending zone at the transition from the fastening element of the diaphragm to the elastic diaphragm, in that the diaphragm is supported by the main body.

According to one configuration of the filter plate according to the invention, at least a first section of the fastening surfaces encloses an angle of greater than 90 degrees with the plane defined by the filter plate. The angle is in particular in a range from 92 degrees to 100 degrees, preferably in a range from 93 degrees to 97 degrees, and particularly preferably this angle is 95 degrees. In this way, an oblique, outwardly open welding surface is provided at the indentation, such that a force component can be exerted during the cooling following the welding operation, said force component acting perpendicularly to the filter plate plane. Thus, voids and leaks can be avoided.

According to a development of the filter plate according to the invention, at least a second section of the fastening surfaces is oriented substantially parallel to the plane defined by the filter plate. In this way, fastening surfaces can be formed which fix the diaphragm to the main body in two directions which are substantially perpendicular to one another. As a result, particularly durable fastening of the diaphragm to the main body can be produced.

According to a development of the filter plate according to the invention, a gap adjoins the fastening surfaces in the indentation between the fastening element of the diaphragm and the main body, the diaphragm not being welded to the main body at said gap. This gap, formed in the indentation, between the fastening element of the diaphragm and the main body can adjoin the fastening surface, which is oriented parallel to the plane defined by the filter plate. Alternatively or in addition, the gap can be oriented substantially perpendicularly to the plane defined by the filter plate. The gap can advantageously receive an excess of a welding material which arises at the welded connection between the diaphragm and the main body. This excess thus does not escape into the pressure chamber.

The fastening surfaces of the welded connection between the diaphragm and the main body are configured such that they detach in the event of faulty operation of the filter press, when filtering has started, without the closing pressure, which presses the filter plates together, being applied. Specifically, in the case of known welded-on diaphragms, the problem arises that in the case of such faulty operation, the connection between the diaphragm and the main plate is not detached. This has the result that the filter plate is shot out of the filter press. In the case of the filter plate according to the invention, the welded connection is configured such that it detaches when a high filtration pressure is applied, without the filter press being closed. With the filter press closed, by contrast, the diaphragm cannot detach from the main body.

According to a further configuration of the filter plate according to the invention, a pressure surface is formed on the plate frame of the main body, said pressure surface being oriented parallel to the plane defined by the filter plate. It is possible for the closing pressure or the press closing force of the filter press to be exerted on this pressure surface. The plate frame, or the entire main body, thus consists of a material which is able to withstand the press closing force of the filter press. Furthermore, the fastening element of the diaphragm is flush with the pressure surface of the plate frame at the surface facing away from the indentation. This surface adjoins in particular the pressure surface of the plate frame. However, no press closing force of the filter press is exerted on this surface. The material of which the diaphragm consists thus does not need to be able to withstand the press closing force.

According to a preferred development, a radially oriented filtrate drainage groove is formed in the surface of the filter plate, which extends from the surface of the fastening element of the diaphragm to the pressure surface of the plate frame. The filtrate drainage groove thus merges into the region on which the press closing force of the filter press acts. This prevents the opening of the filtrate drain from being clogged by the filter cloth, since the filter cloth is non-movable in the region on which the press closing force of the filter press acts. Moreover, advantageously, the welded connection between the diaphragm and the main body is not centrally interrupted by the drainage groove.

According to an alternative development, an obliquely extending filtrate drainage bore is formed in the filter plate, which begins at the surface of the filter plate and ends in a central bore.

In the case of the filter plate according to the invention, the main body is formed in particular in one piece, i.e. the peripheral plate frame and the central body consist of the same material and are manufactured from one piece. The main body may consist for example of a thermoplastic such as polypropylene, polyethylene or polyvinylidene fluoride.

The diaphragm consists in particular of a material which is fusible with the material of the main body. It is in particular a thermoplastic that is fusible with the material of the main body. The hardness of the material can thus extend over the entire possible hardness spectrum of thermoplastics. The Shore hardness of the diaphragm is for example in a range from 70 ShA to 90 ShA.

BRIEF DESCRIPTION OF THE DRAWINGS

The invention will now be explained by way of an exemplary embodiment with reference to the drawings.

DETAILED DESCRIPTION OF THE INVENTION

Figure 1:
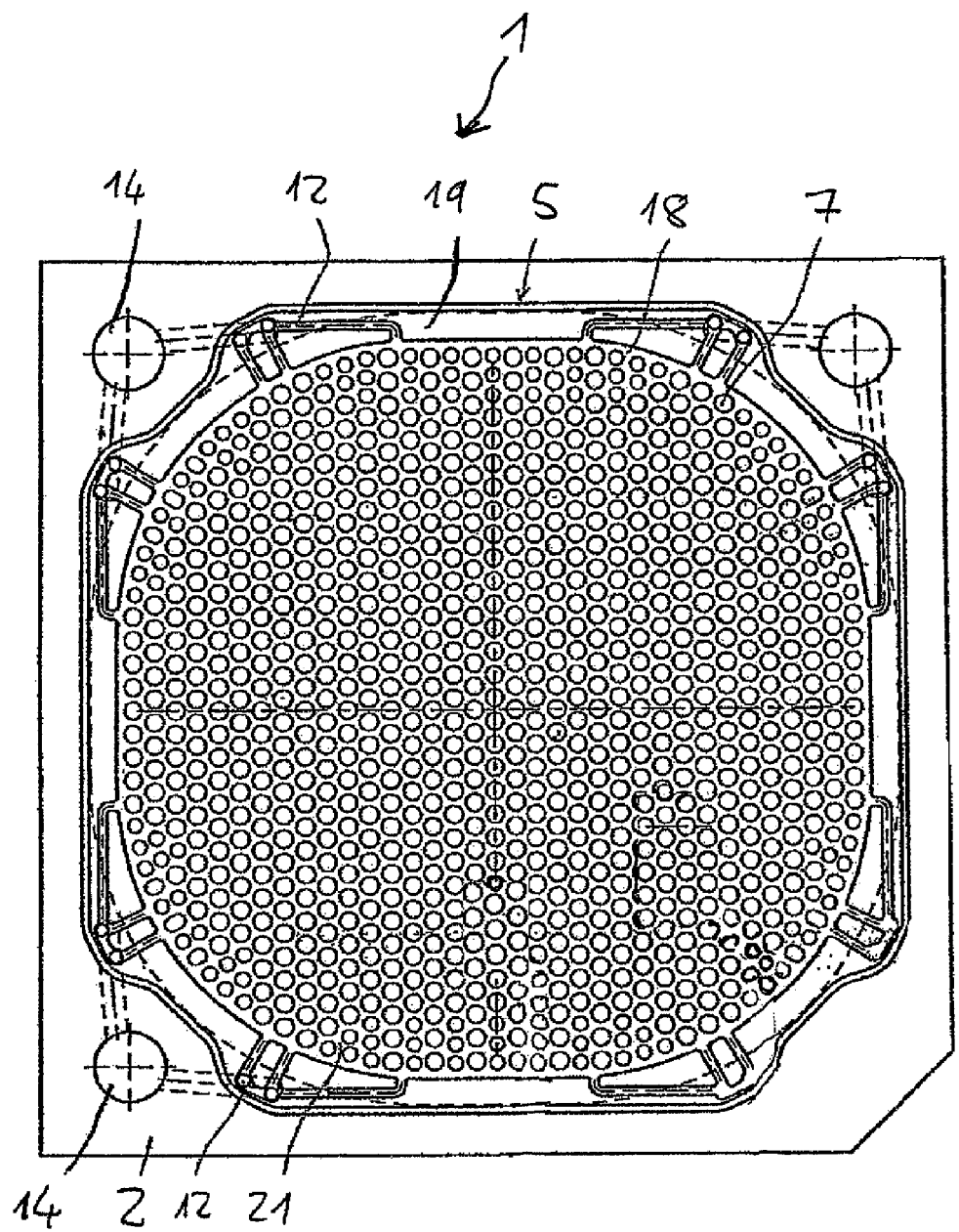
FIG. 1 shows a plan view of an exemplary embodiment of the filter plate according to the invention.

FIG. 1 shows the filter plate 1 according to the invention in plan view. The filter plate 1 comprises a main body 2, to which a diaphragm 5 is non-detachably fastened. The diaphragm 5 is fastened to the main body 2 by means of a fastening element 6, as will be explained later in detail. Attached to the diaphragm surface 18 are a multiplicity of knobs 7 as supporting elements for a filter cloth 10. The intermediate spaces between the knobs form drainage channels 21, through which the filtrate can drain away during filtration. These drainage channels 21 are adjoined by corresponding continuing channels in the form of filtrate drainage grooves 12 and openings, which guide the filtrate finally into the bores 14 which pass perpendicularly through the filter plate 1. The knobs 7 are bounded by the diaphragm rim 19.

Figure 2:
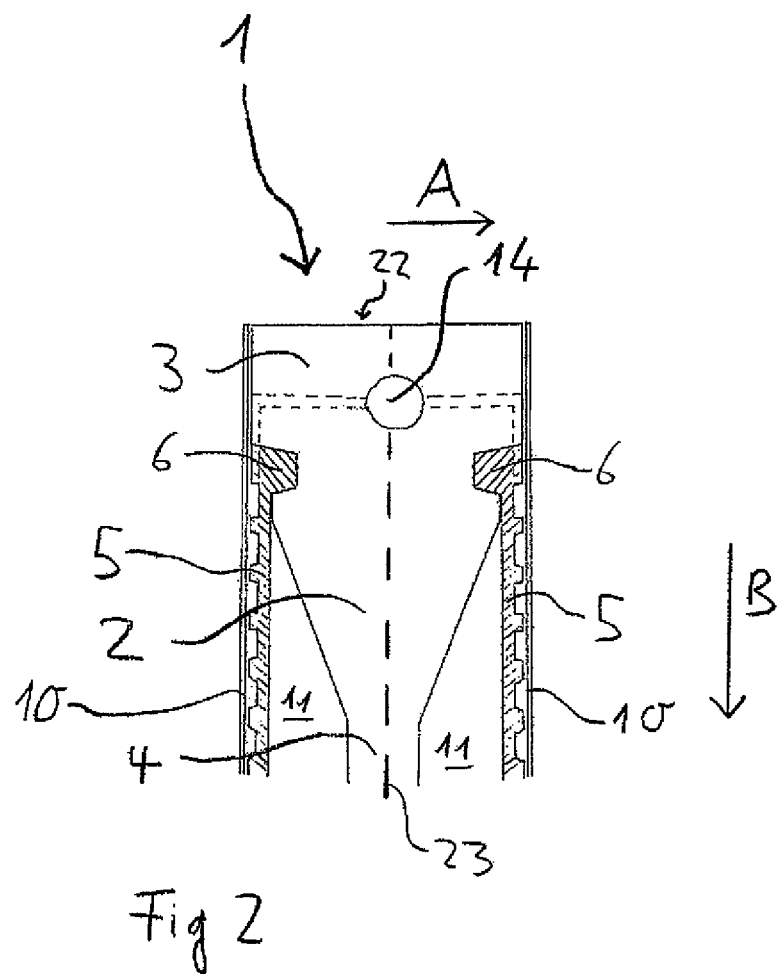
FIG. 2 shows a partial sectional view of the exemplary embodiment of the filter plate according to the invention.
Figure 3:
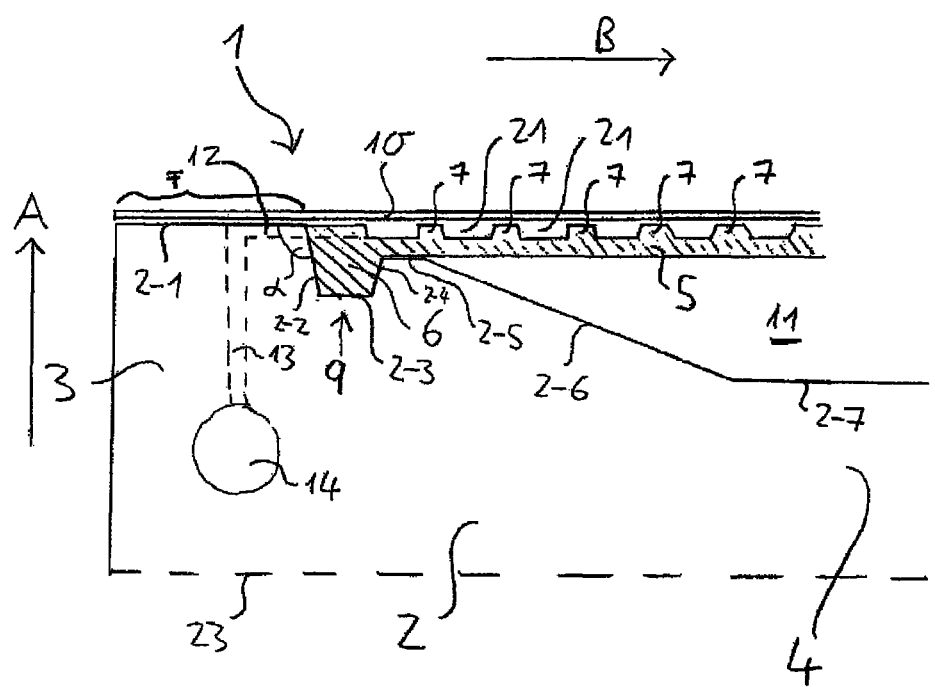
FIG. 3 shows a detail view of FIGS. 2.
Figure 4:
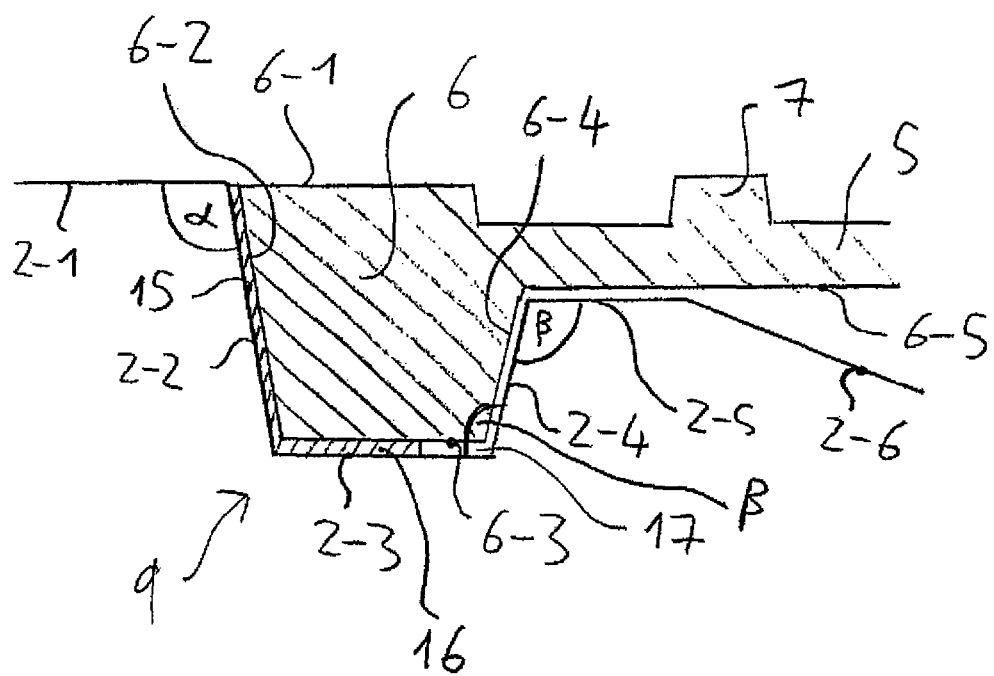
FIG. 4 shows a detail view of FIG. 3.

FIGS. 2 to 4 show partial sectional views through the filter plate 1 according to the invention, which is constructed in a mirror-symmetrical manner with respect to its longitudinal center axis 23. The diaphragms 5 are non-detachably fastened to the main body 2 on the two opposite sides. The main body 2 is formed in one piece and consists of a plastics material, in particular of polypropylene, polyethylene or polyvinylidene fluoride. The diaphragm 5 consists of a thermoplastic which is fusible with the material of the main body 2. The Shore hardness of the material of the main body 2 is for example greater than or equal to 70 ShA. The Shore hardness of the diaphragms 5 is in particular in a range from 70 ShA to 90 ShA.

As can be seen in particular from the sectional views in FIGS. 2 and 3, the main body 2 forms a plate frame 3 peripherally and a central body 4 in the center. Proceeding from the end face 22 of the filter plate 1, the filter plate 1 has its greatest thickness at the plate frame 3. In direction B in the filter plate plane, the main body 2 narrows towards the center as far as the central body 4.

As is discernible in the detail views in FIGS. 3 and 4, at the plate frame 3 a section 2-1 first of all formed at the plate frame 3 in the direction B of the filter plate plane, said section 2-1 extending parallel to the filter plate plane. The surface formed by this section 2-1 forms a pressure surface, on which the press closing force acts when the filter plate 1 is used in a filter press. At this pressure surface, an adjacent filter plate rests against the filter plate 1, wherein two filter cloths 10 can be clamped between the two filter plates.

The section 2-1 of the plate frame 3 is adjoined by a transition region between the plate frame 3 and the central body 4. Formed in this transition region is an indentation 9, in which the diaphragm 5 is fastened, as will be explained later. The indentation 9 is formed by the sections 2-2, 2-3 and 2-4 of the main body 2. The section 2-2 adjoins the section 2-1. The pressure surface formed by the section 2-1 encloses an angle α with the fastening surface formed by the section 2-2, as is illustrated in FIGS. 3 and 4. The angle α is somewhat larger than 90 degrees. It is, for example, in a range from 92 degrees to 100 degrees, preferably in a range from 93 degrees to 97 degrees. In the present exemplary embodiment, the angle is 95 degrees. The surface formed by the section 2-2 thus encloses an angle of 5 degrees with a plane which is perpendicular to the filter plate plane. The surface formed by the section 2-2 thus extends obliquely into the filter plate 1 in the direction of the thickness of latter.

The section 2-2 is adjoined by a section 2-3, which again extends parallel to the filter plate plane. The section 2-3 is adjoined by a section 2-4, which encloses an angle β with the section 2-3, as is shown in FIG. 4. The angle β is also greater than 90 degrees. In the present exemplary embodiment, the angles α and β are identical. However, this is not necessarily the case. The section 2-4 extends again obliquely toward the surface in the direction A of the thickness of the filter plate 1. However, the section 2-4 is shorter than the section 2-2. Toward the surface, a section which corresponds substantially to the thickness of the diaphragm 5 including the knobs 7 remains in the direction A of the thickness of the filter plate 1.

The section 2-4 is adjoined by a section 2-5 which is again oriented parallel to the filter plate plane, such that the section 2-4 and the section 2-5 also enclose the angle β.

The section 2-5 is adjoined by the section 2-6, at which the main body 2 narrows again with respect to its thickness, until it merges into the central body 4 at the section 2-7. The section 2-7 is again oriented parallel to the filter plate plane.

In the following text, the manner in which the diaphragm 5 is non-detachably fastened to the main body 2 is explained with reference to FIGS. 3 and 4:

A fastening element 6 is formed peripherally on the diaphragm 5. The fastening element 6 extends circumferentially around the diaphragm 5. The fastening element 6 is formed in a manner similar to a circumferential bead. However, the shape of the fastening element 6 differs from the bead of a conventional diaphragm, which is fastened detachably to the main body 2 of a filter plate 1. The shape of the fastening element 6 is matched at least partially to the shape of the indentation 9 in the main body 2, such that the indentation 9 at least partially receives the fastening element 6 of the diaphragm 5. In this case, fastening surfaces are formed between the fastening element 6 and the indentation 9, as is illustrated best in FIG. 4.

The fastening element 6 has a section 6-2, which forms a surface which corresponds to the surface formed by the section 2-2 of the main body 2. When the diaphragm 5 is oriented parallel to the plane formed by the filter plate 1, the surface formed by the section 6-2 is oriented parallel to the surface formed by the section 2-2. It rests in particular against the surface formed by the section 2-2, such that at this fastening surface the fastening element 6 of the diaphragm 5 can form a welded connection 15 with the surface formed by the section 2-2. The length of the section 6-2 corresponds substantially to the length of the section 2-2 of the main body 2.

As in the case of the indentation 9, the section 6-2 is adjoined by a section 6-3, which corresponds to the section 2-3 of the main body 2. Thus, the section 6-3 is oriented parallel to the filter plate plane and the diaphragm plane. The section 6-3 is adjoined by the section 6-4, which corresponds to the section 2-4 of the main body 2. This is adjoined in turn by the section 6-5, which is oriented parallel to the section 2-5 of the main body 2. The section 6-5 represents the underside of the diaphragm 5, which faces away from the side of the diaphragm 5 on which the knobs 7 are formed. A pressure chamber 11 is formed by this underside 6-5 of the diaphragm 5 and the sections 2-6 and 2-7 of the main body 2. The pressure chamber 11 can be attached by means of an individual connection to the collecting line for pressure medium by a connector attached from the outside to the end side 22 of the main body 2. In the unloaded rest state, the underside 6-5 of the diaphragm 5 is oriented substantially parallel to the filter plate plane. In the loaded state, i.e. when the pressure medium in the pressure chamber 11 exerts a pressure on the diaphragm 5, the diaphragm 5 is deformed in the direction of the filtration chamber, which is formed on that side of the diaphragm 5 on which the knobs 7 are formed. In this way, a pressure is exerted on the filter cake in the filtration chamber.

At the surface formed by the section 6-2, a further welded connection 16 with the surface formed by the section 2-3 of the main body 2 can be formed. This welded connection 16 does not extend over the entire width of the sections 2-3 and 6-3, but only over a part, such that a gap 17 can be formed between the fastening element 6 of the diaphragm 5 and the main body 2. This gap 17 serves to receive any excess during the production of the welded connection 16. The gap 17 can be formed only in the region between the surfaces of the sections 6-3 and 2-3. However, it is also possible for the gap 17 to be continued such that it can be formed between the surfaces formed by the sections 6-4 and 2-4.

In order to produce the welded connection 15, 16 between the indentation 9 of the main body 2 and the fastening element 6 of the diaphragm 5, the fastening element 6 is heated in the regions in which the welded connection is intended to be formed. Thereupon, the fastening element 6 is inserted with a precise fit into the indentation 9, and a pressure is exerted perpendicularly to the filter plate plane in a direction counter to the arrow A. On account of the oblique formation of the sections 2-2 and 6-2, this pressure direction has a component which is oriented perpendicularly to the surfaces formed by these sections 2-2 and 6-2, such that the surface, formed by the section 6-2, of the fastening element 6 is pressed against the surface formed by the section 2-2. An excess, possibly occurring during the production of the welded connection 15, 16, at the peripheries of the welded connection 15, 16 can be received on the one hand by the gap 17. On the other hand, it can escape at the top side of the filter plate 1, where it can easily be removed. Any excess of the welding material thus does not escape into the pressure chamber 11 in an uncontrolled manner.

On account of the welded connection 15, 16 between the fastening element 6 of the diaphragm 5 and the main body 2 at the indentation 9, a sealed, non-detachable connection between the diaphragm 5 and the main body 2 is produced.

Once the diaphragm 5 has been fastened in a non-detachable manner in the indentation 9 of the main body 2 by the welded connection 15, 16, a surface is formed by the section 6-1 at the fastening element 6, said surface being flush with the pressure surface 2-1 of the main body 2. However, the surface formed by the section 6-1 is located in a region in which no press closing force acts when the filter plate 1 is used in a filter press. This region is denoted F in FIG. 3. The press closing force thus pushes only the individual plate frames 3 of the filter plates 1 against one another, but does not act on the surface of the fastening element 6 of the diaphragm 5.

When the diaphragm 5 has been fastened to the main body 2, the surface, formed by the section 2-5, of the main body 2 rests against the underside 6-5 of the diaphragm 5, or a narrow gap is formed between the underside 6-5 of the diaphragm 5 and the surface, formed by the section 2-5, of the main body 2. In this way, a protrusion is formed by the main plate 2 at the section 2-5, said protrusion being able to support the diaphragm 5 at the underside 6-5 in a region which is adjacent to the fastening element 6. In the event of a deformation of the diaphragm 5, this region is particularly susceptible to any breakage of the diaphragm 5. As a result of the formation of the fastening of the diaphragm 5 to the main body 2 of the filter plate 1, the diaphragm 5 can be protected by this protrusion from breakage during operation of the filter press.

On that side of the diaphragm 5 on which the knobs 7 are formed, a filter cloth 10 can be fastened to the filter plate 1 in a manner known per se. The filter cloth can be clamped, for example with the filter press closed, between two filter plates 1. Furthermore, the filter cloth 10 can be fastened in a further groove (not shown) in the plate frame 3 of the main body 2. The fastening of the filter cloth 10 takes place in particular further out on the rim than the fastening of the diaphragm 5.

As was explained above, drainage channels 21 for the filtrate are formed between the knobs 7 of the diaphragm 5. The filtrate has to be discharged peripherally. For this purpose, a filtrate drainage groove 12 is formed on the surface of the fastening element 6 at the section 6-1, said filtrate drainage groove 12 merging into the section 2-1 of the main body 2. The filtrate drainage groove 12 thus extends radially outwardly. It merges finally into a bore 13, which opens into the bore 14 which extends perpendicularly thereto and via which the filtrate of all the filter plates of the filter press is discharged. The diameter of the filtrate drainage groove 12 is in a range from about 4 mm to 8 mm, in particular 6 mm. The filtrate drainage groove 12 is located in a region F in which the press closing force of the filter press acts. This prevents the filter cloth 10 from closing the filtrate drainage groove 12. Specifically, the filter cloth 11 is held on the surface of the filter plate 1 at the filtrate drainage channel 12 by the press closing force.

According to an alternative configuration, the filtrate is discharged by an obliquely extending filtrate drainage bore, which begins at the surface of the filter plate, in particular at a drainage channel 21 which is adjacent to the fastening element 6, and ends in the bore 14.

LIST OF REFERENCE SIGNS

1 Filter plate
2 Main body
3 Plate frame
4 Central body of the main body 2
5 Diaphragm
6 Fastening element
7 Knobs
9 Indentation
10 Filter cloth
11 Pressure chamber
12 Filtrate drainage channel
13 Bore 14 Bore
15 Welded connection
16 Welded connection
17 Gap
18 Drainage channels
19 Diaphragm rim
21 Drainage channels
22 End side
23 Center axis Having described the invention, the following is claimed:

1. A filter plate for a filter press, the filter plate comprising:
 a main body, and
 a diaphragm including a fastening element located at the periphery of the diaphragm, wherein the diaphragm is fastened non-detachably to the main body,
 wherein
  an indentation is formed in the main body, said indentation at least partially accommodating the fastening element of the diaphragm,
  a welded connection is provided between (i) a first fastening surface of the indentation formed in the main body and (ii) a second fastening surface of the fastening element of the diaphragm, and
  at least a first section of the first fastening surface and a first section of the second fastening surface enclose an angle of greater than 90 degrees with respect to a plane defined by the main body.

2. The filter plate as claimed in claim 1, wherein the main body includes:
 a plate frame located at the periphery of the main body, and
 a central body located at the center of the main body,
 wherein the main body narrows from the plate frame toward the central body, said indentation formed in a transition region between the plate frame and the central body of the main body.

3. The filter plate as claimed in claim 2,
 wherein the thickness of the main body increases outwardly from the central body, initially decreases at the indentation and finally increases again up to the thickness at the plate frame, such that a protrusion is formed next to the indentation.

4. The filter plate as claimed in claim 3,
 wherein the protrusion comes into contact with a section of the diaphragm adjacent to the fastening element, or forms a narrow gap with respect to said section of the diaphragm, such that when the diaphragm bends, said section of the diaphragm comes into contact with the protrusion and is supported by the protrusion.

5. The filter plate as claimed in claim 2,
 wherein the plate frame of the main body includes a pressure surface, said pressure surface being oriented parallel to the plane defined by the main body, wherein a press closing force of the filter press is exerted thereon, and the fastening element of the diaphragm is flush with the pressure surface of the plate frame at a surface of the diaphragm facing away from the indentation.

6. The filter plate as claimed in claim 5,
 wherein the filter plate further comprises a radially oriented filtrate drainage groove extending from a surface of the fastening element of the diaphragm to the pressure surface of the plate frame.

7. The filter plate as claimed in claim 5,
 wherein the filter plate further comprises an obliquely extending filtrate drainage bore beginning at the pressure surface of the filter plate and ending in a central bore.

8. The filter plate as claimed in claim 1,
 wherein the first section of the first fastening surface and the first section of the second fastening surface are at an angle in a range from 92 degrees to 100 degrees with respect to the plane defined by the main body.

9. The filter plate as claimed in claim 1,
 wherein at least a second section of the first fastening surface and a second section of the second fastening surface are oriented substantially parallel to the plane defined by the main body.

10. The filter plate as claimed in claim 9,
 wherein a gap in said indentation adjoins the first and second fastening surfaces between the fastening element of the diaphragm and the main body, said diaphragm not welded to the main body at said gap.

11. The filter plate as claimed in claim 1,
 wherein a gap in said indentation adjoins the first and second fastening surfaces between the fastening element of the diaphragm and the main body, said diaphragm not welded to the main body at said gap.

12. The filter plate as claimed in claim 1
 wherein the diaphragm is comprised of a thermoplastic which is fusible with a material of the main body.

* * * * *